United States Patent [19]

Matsui et al.

[11] Patent Number: 5,021,931
[45] Date of Patent: Jun. 4, 1991

[54] LENTICULAR LUMINESCENT SCREEN

[75] Inventors: Fumio Matsui; Yasushi Murata, both of Saitama, Japan

[73] Assignee: Pioneer Electronic Corporation, Tokyo, Japan

[21] Appl. No.: 480,567

[22] Filed: Feb. 15, 1990

[30] Foreign Application Priority Data

May 31, 1989 [JP] Japan ................................. 1-138210

[51] Int. Cl.$^5$ ............................................. F21V 9/16
[52] U.S. Cl. ....................................... 362/84; 362/311; 313/466; 313/474
[58] Field of Search .................... 362/84, 89, 97, 253, 362/311; 313/466, 474

[56] References Cited

U.S. PATENT DOCUMENTS 2,807,737 9/1957 Wright .................. 313/474
4,082,978 4/1978 Schwarz ................ 313/474

Primary Examiner—Stephen F. Husar
Attorney, Agent, or Firm—Wegner, Cantor, Mueller & Player

[57] ABSTRACT

A lenticular luminescent screen includes a lenticular base plate made of a transparent material which contains a substance capable of emitting luminescent light in response to stimulating light applied thereto. The lenticular base plate having at least one surface composed of a plurality of adjacent partly cylindrical lens elements. Since the cylindrical lens elements can catch stimulating light with a higher efficiency, the luminescent screen can emit an increased intensity of luminescent light. Inasmuch as the luminescent screen is reduced in thickness between the adjacent cylindrical lens elements, emitted luminescent light is prevented from leaking in a direction across the axes of the cylindrical lens elements.

3 Claims, 2 Drawing Sheets

STIMULATING LIGHT

STIMULATING LIGHT

STIMULATING LIGHT

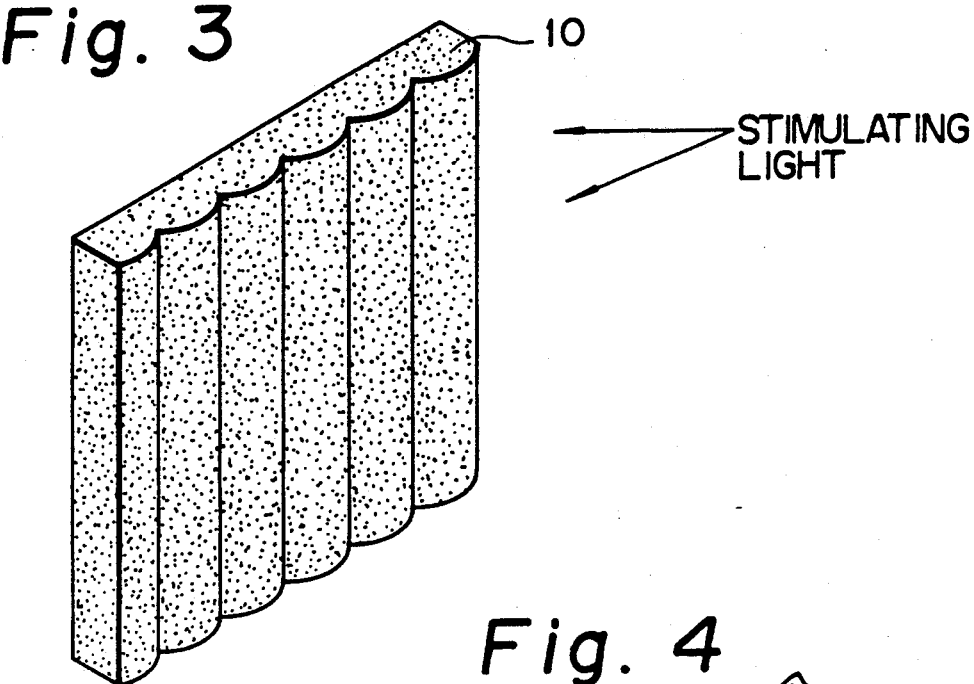
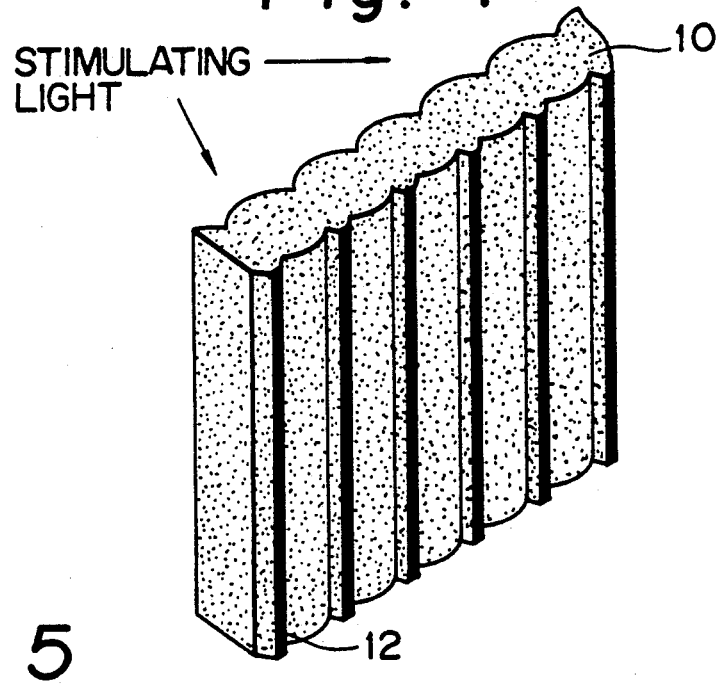
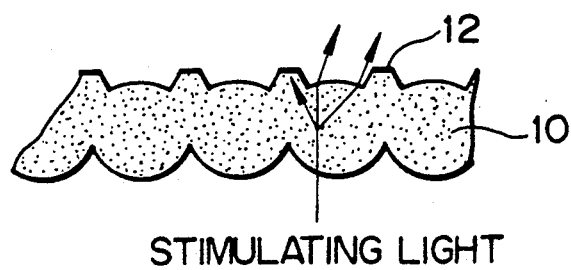

LENTICULAR LUMINESCENT SCREEN

BACKGROUND OF THE INVENTION

1. Field of the Invention

The present invention relates to a luminescent screen containing a substance capable of emitting light in response to stimulating light applied thereto.

2. Description of the Prior Art

There are known luminescent screens which comprise a flat screen plate which contains a substance (a luminescent substance) capable of fluorescence or phosphorescence in response to stimulating light such as ultraviolet radiation, visible light, near-infrared radiation, or the like, the fluorescent substance comprising a piperidinium tetra (benzoyltrifluoroacetone) europium complex, for example. The stimulating light is applied as a circular spot to the screen plate to enable it to emit luminescent light that serves as a pixel, thereby displaying an image. The luminescent screen is used as a display element of an image display system of the back-projection type or front-projection type. In the back-projection-type image display system, stimulating light is applied to one side (back surface) of the luminescent screen, which emits luminescent light from the other side (display surface) thereof for the observer to see. In the front-projection-type image display system stimulating light is applied to one side (display surface) of the luminescent screen, which emits luminescent light from the same side for the viewer to see.

Since the luminescent screen of the back-projection-type image display system comprises a flat screen plate, as shown in FIG. 1 of the accompanying drawings, when stimulating light is applied as a spot to a back surface 20b of the luminescent screen 20, luminescent light which is emitted from the luminescent substance is scattered in every direction, including directions toward both surfaces 20a, 20b of the luminescent screen 20 and directions propagated in the flat screen plate. Therefore, the efficiency with which the applied stimulating light is utilized is low, and the intensity of luminescent light emitted toward the display surface 20a of the screen plate is so low that the screen as viewed by the viewer is relatively dark.

SUMMARY OF THE INVENTION

In view of the aforesaid drawbacks of the conventional luminescent screen, it is an object of the present invention to provide a luminescent screen which emits luminescent light of a increased intensity toward a viewer for a greater degree of screen brightness in response to a reference intensity of stimulating light applied to the screen.

According to the present invention, a luminescent screen comprises a lenticular base plate made of a transparent material which contains a substance capable of emitting luminescent light in response to stimulating light applied thereto, the lenticular base plate having at least one surface composed of a plurality of adjacent partly cylindrical convex surfaces.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 2, 3, and 4 are fragmentary perspective views of luminescent screens according to embodiments of the present invention; and FIG. 5 is a fragmentary cross-sectional view of the luminescent screen shown in FIG. 4.

DETAILED DESCRIPTION OF THE PREFERRED EMBODIMENTS

Figure 1:
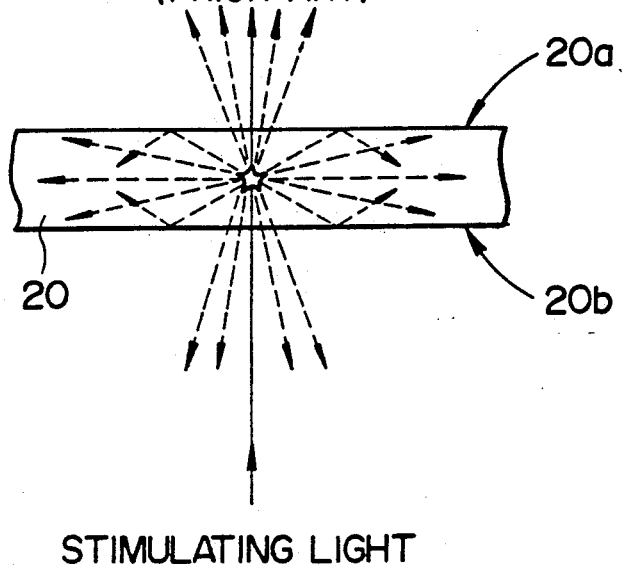
FIG. 1 is a fragmentary cross-sectional view of a conventional luminescent screen.
Figure 2:
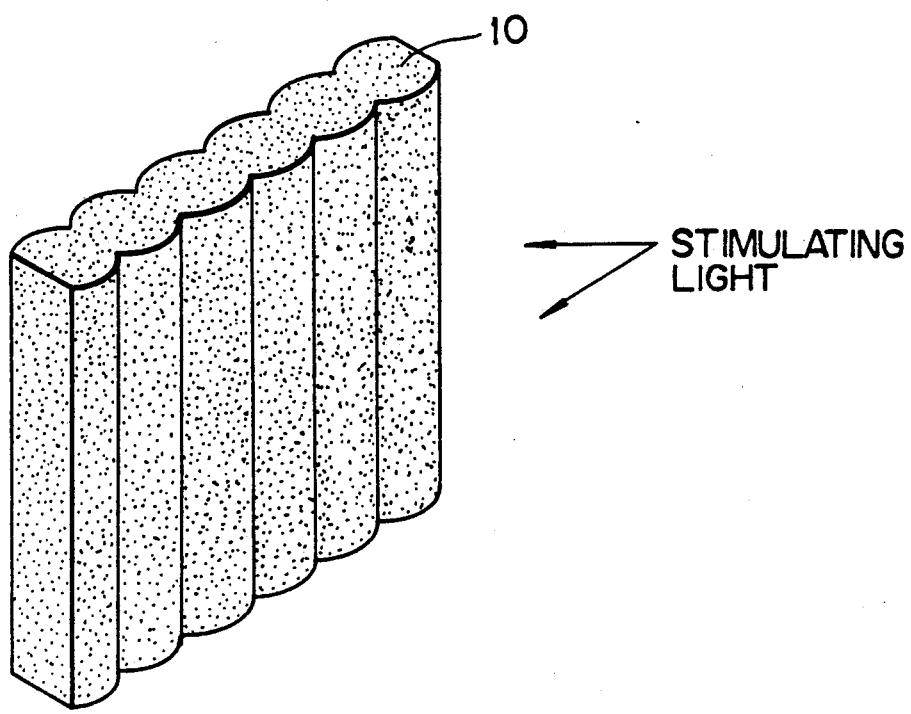

FIG. 2 shows a luminescent screen according to an embodiment of the present invention, which is used in an image display system of the back-projection type. The luminescent screen comprises a lenticular luminescent screen which includes a base plate 10 in the form of a lenticular lens with a luminescent substance dispersed therein. More specifically, the luminescent screen is manufactured by mixing a known luminescent substance, such as the substance referred to above, into a transparent synthetic resin material, and extrusion-molding the synthetic resin material in which the luminescent substance is mixed, with a mold which has a mold cavity complementary in shape to a desired lenticular screen that has a series of cylindrical lens elements on both surfaces thereof.

The lenticular lens itself comprises a transparent plate having a group of embossed, substantially semi-cylindrical lens elements on at least one of the surfaces thereof, the lens elements having adjacent surface areas extending parallel to each other.

As shown in FIG. 2, the lenticular lens for use as the base plate of the luminescent screen has cylindrical lens elements disposed on both surfaces in confronting relation and extending parallel to each other. However, as shown in FIG. 3, one of the surfaces of a luminescent screen may be flat and only the other surface may have a series of parallel partly cylindrical lens elements. In each of the embodiments of FIGS. 2 and 3, since the lenticular lens is constricted and reduced in base plate thickness between the lens elements, the luminescent light which traverses the axes of the lens elements and which is propagated in the base plate 10 is reduced in intensity.

As shown in FIG. 4, partition ridges extending parallel to cylindrical lens elements may be disposed between the adjacent cylindrical lens elements, with black strip regions 12 applied to the front surfaces of the partition ridges. As shown in FIG. 5, the black strip regions 12 are effective in reducing luminescent crosstalk light from the adjacent cylindrical lens elements.

With the present invention, as described above, the lenticular luminescent screen comprises a base plate in the form of a lenticular lens and made of a transparent material that contains a luminescent substance. Since the cylindrical lens elements can catch stimulating light with a higher efficiency, the luminescent screen can emit an increased intensity of luminescent light. Inasmuch as the luminescent screen is reduced in thickness between the adjacent cylindrical lens elements, emitted luminescent light is prevented from leaking in a direction across the axes of the cylindrical lens elements. If the luminescent screen has lenticular lenses on its both surfaces, the intensity of ambient light which is totally reflected by the surfaces of the screen is low, and emitted luminescent light is concentrated by the surfaces of the cylindrical lens elements, thereby allowing the screen to have a higher level of brightness.

Although certain preferred embodiments have been shown and described, it should be understood that many changes and modifications may be made therein without departing from the scope of the appended claims.

What is claimed is:

1. A lenticular luminescent screen used for a back or front projection type image display system comprising a base plate made of a mixture of a transparent synthetic resin and a luminescent substance, said luminescent substance being capable of emitting luminescent light when stimulating light is applied thereto, said base plate having at least one surface composed of a plurality of cylindrical convex surfaces extending adjacent and parallel to each other.

2. A lenticular luminescent screen according to claim 1, further including a plurality of black regions disposed between said cylindrical convex surfaces.

3. A lenticular luminescent screen comprising a lenticular base plate made up of a transparent material which contains a substance capable of emitting luminescent light in response to stimulating light applied thereto, said lenticular base plate having at least one surface comprising a plurality of adjacent partly cylindrical convex surfaces and a plurality of black regions disposed between said partly cylindrical convex surfaces.

* * * * *